United States Patent
Hamade et al.

(10) Patent No.: US 11,278,017 B2
(45) Date of Patent: Mar. 22, 2022

(54) AUTOMATIC FISHING SYSTEM AND AUTOMATIC FISHING METHOD

(71) Applicant: TOWA DENKI SEISAKUSYO CO., LTD., Hakodate (JP)

(72) Inventors: Yuichi Hamade, Hakodate (JP); Tomohiro Miki, Hakodate (JP)

(73) Assignee: TOWA DENKI SEISAKUSYO CO., LTD., Hakodate (JP)

( * ) Notice: Subject to any disclaimer, the term of this patent is extended or adjusted under 35 U.S.C. 154(b) by 158 days.

(21) Appl. No.: 16/712,414

(22) Filed: Dec. 12, 2019

(65) Prior Publication Data

US 2020/0113162 A1 Apr. 16, 2020

Related U.S. Application Data

(63) Continuation of application No. PCT/JP2018/016401, filed on Apr. 23, 2018.

(30) Foreign Application Priority Data

Jun. 30, 2017 (JP) .............................. JP2017-128578

(51) Int. Cl.
*A01K 89/08* (2006.01)
*A01K 89/017* (2006.01)
(Continued)

(52) U.S. Cl.
CPC ............ *A01K 97/125* (2013.01); *A01K 79/00* (2013.01); *A01K 89/017* (2013.01); *A01K 89/08* (2013.01)

(58) Field of Classification Search
CPC .. A01K 89/08; A01K 89/017; A01K 89/0178; A01K 91/06; A01K 91/065;
(Continued)

(56) References Cited

U.S. PATENT DOCUMENTS 4,388,774 A * 6/1983 Thoemke ............... A01K 91/08
114/255
4,752,878 A * 6/1988 Sigurdsson .......... A01K 89/017
43/15
(Continued)

FOREIGN PATENT DOCUMENTS

CN 203759520 U 8/2014
CN 105211024 A 1/2016
(Continued)

OTHER PUBLICATIONS

Office Action dated May 25, 2021, issued in counterpart JP application No. 2017-128578, with English translation. (6 pages).
(Continued)

*Primary Examiner* — Darren W Ark
*Assistant Examiner* — William L Gmoser
(74) *Attorney, Agent, or Firm* — Westerman, Hattori, Daniels & Adrian, LLP

(57) ABSTRACT

An automatic fishing system includes a plurality of fishing machines each of which has rotation drums capable of winding fishing lines and capable of rotating in a reeling direction and an unreeling direction, a drive motor for driving the rotation drums in the reeling direction and the unreeling direction, and an electromagnetic clutch for transmitting rotation of the drive motor to the rotation drums, a hooking detection means for always detecting hooking of fish at any one of the plurality of fishing machines, and a fishing machine control means for controlling operations of the plurality of fishing machines in accordance with detection result of the hooking detection means. The fishing machine control means controls the rotation drums of other fishing machines that hook no fish in the reeling direction so that hooks of the other fishing machines are wound up to a water surface or near the water surface.

6 Claims, 11 Drawing Sheets

(51) Int. Cl.
*A01K 97/12* (2006.01)
*A01K 79/00* (2006.01)

(58) Field of Classification Search
CPC ...... A01K 91/10; A01K 97/12; A01K 97/125;
A01K 79/00; A01K 97/00; A01K 97/11
USPC ................... 43/15, 16, 17, 4, 4.5, 26.1, 19.2
See application file for complete search history.

(56) References Cited

U.S. PATENT DOCUMENTS

| | | | | |
|---|---|---|---|---|
| 4,793,088 | A | * 12/1988 | Fortuna | ................. A01K 91/08 43/26.1 |
| 5,581,930 | A | 12/1996 | Langer | |
| 5,833,156 | A | * 11/1998 | Park | ................. A01K 89/01555 242/289 |
| 2007/0266615 | A1 | * 11/2007 | Norman | ............... A01K 91/065 43/19.2 |

FOREIGN PATENT DOCUMENTS

| | | | | |
|---|---|---|---|---|
| EP | 1997372 | A2 * | 12/2008 | ........... A01K 97/125 |
| JP | 2-138930 | A | 5/1990 | |
| JP | 7-87864 | A | 4/1995 | |
| JP | 10-178992 | A | 7/1998 | |
| JP | 11-289935 | A | 10/1999 | |
| JP | 2007-104978 | A | 4/2007 | |

OTHER PUBLICATIONS

International Search Report dated Jul. 3, 2018, issued in counterpart International Application No. PCT/JP2018/016401 (2 pages).
Anglers Fisherman; The South China Sea Wenchang Sea Fishing Trip accidentally caught yellowfin tuna, Fishing artifacts!, Apr. 30, 2015, 23:31:13, internet: <URL: https://m.diaoyur.com/a/2015/11210.html>, with Google English translation, cited in CN Office Action dated Mar. 11, 2021 and CN Search Report dated Mar. 4, 2021. (5 pages).

* cited by examiner

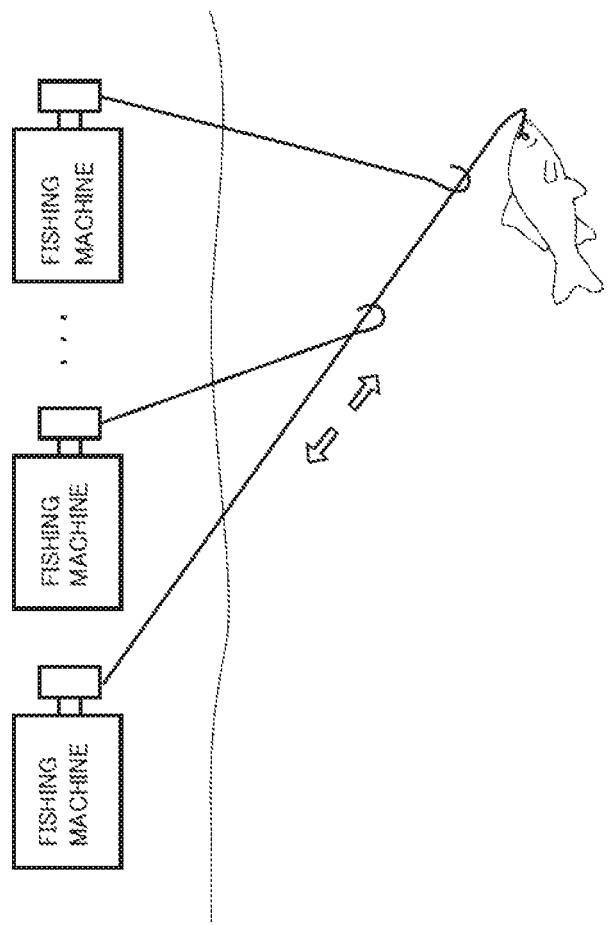

AUTOMATIC FISHING SYSTEM AND AUTOMATIC FISHING METHOD

FIELD OF THE INVENTION

The present invention relates to an automatic fishing system equipped with, on shipboard, a plurality of fishing machines each having rotation drums for reeling and unreeling fishing lines, and to an automatic fishing method.

BACKGROUND ART

In a fishing boat provided with a plurality of fishing machines, if a fish or fishes are hooked on one fishing machine, it is necessary to quickly control other fishing machines for preventing tangle of fishing lines or hooks from occurring. For example, when a fish or fishes are hooked on one of the fishing machines, a crew of the fishing boat has to hurryingly run to other fishing machines so as to quickly stop the operation of these other fishing machines and to wind up the fishing lines of these other fishing machines so as to pick up the fishing lines and the hooks from sea. If no such action is performed and the hooked fish runs around in the sea, tangle may occur between the fishing line and/or the hook of one fishing machine and the fishing line and/or the hooks of other fishing machines as shown in FIG. 11. In the worst case, the caught fish may be missed and the fishing lines and/or the hooks of the other fishing machines may be damaged. Even more particularly, it is dangerous to run around on the board when landing of fish began, and also even if enough members are on the board, other work (work in the fishing boat) may be disturbed. Furthermore, when there are a lot of fishing machines on which no fish is caught, it is quite difficult to roll up all of them quickly.

In Patent Document 1, described is an automatic fishing apparatus provided with a plurality of fishing machines mounted on a fishing boat, for controlling operations of these fishing machines by means of a centralized control device. According to the automatic fishing apparatus described in Patent Document 1, which is proposed by the applicant of this application, the plurality of fishing machines on the fishing boat are divided into a plurality of groups. Movements of hooks of the fishing machines in each group are synchronized with each other by means of the centralized control device so as to attract a school of fish (fish layer) into a water depth area with a constant depth from the water surface.

RELATED ART DOCUMENT

Patent Document

Patent Document 1: Japanese Patent Publication No. H11-289935A

SUMMARY OF THE INVENTION

Problem to be Solved by the Invention

According to the conventional fishing boat with the plurality of fishing machines, as aforementioned, when a fish or fishes are hooked on a part of the fishing machines, no control of other fishing machines for prevention tangle of fishing lines or hooks from occurring was performed at all.

The automatic fishing device described in Patent Document 1 performs centralized control of the plurality of fishing machines by synchronizing the water depths of the hooks of these fishing machines with each other so as to guide the layer of fishes but not to control of the fishing machines when the fish or fishes are hooked.

It is therefore an object of the present invention to provide an automatic fishing system and an automatic fishing method, whereby centralized control of a plurality of fishing machines on shipboard can be performed to prevent tangle of fishing lines or hooks from occurring when a fish or fishes are caught on one of the fishing machines.

Means to Solve the Problem

According to the present invention, an automatic fishing system includes a plurality of fishing machines each of which has rotation drums capable of winding fishing lines and capable of rotating in a reeling direction (wind-up direction) and an unreeling direction (wind-down direction), a drive motor for driving the rotation drums in the reeling direction and the unreeling direction, and an electromagnetic clutch for transmitting rotation of the drive motor to the rotation drums, a hooking detection means for always detecting hooking of fish at any one of the plurality of fishing machines, and a fishing machine control means for controlling operations of the plurality of fishing machines in accordance with detection result of the hooking detection means. The fishing machine control means controls, when hooking of fish at any one of the plurality of fishing machines is detected by the hooking detection means, to rotate the rotation drums of other fishing machines that hook no fish in the reeling direction so that hooks of the other fishing machines are wound up to a water surface or near the water surface.

When hooking of fish at any one of the plurality of fishing machines is detected, the rotation drums of the other fishing machines that hook no fish are promptly rotated in the reeling direction so that hooks of these other fishing machines are wound up to a water surface or near the water surface. Thus, even if the hooked fish runs around in the water, it is possible to quickly prevent tangle of the fishing line or the hook of this fishing machine with fishing lines or hooks of the other fishing machines. As a result, missing of the hooked fish and damage of the fishing lines or the hooks of the other fishing machines can be automatically prevented from occurring. Also, since it is not necessary for the crew of the fishing boat to manually operate the other fishing machines that hook no fish, the safety of the crew can be ensured. Furthermore, even if there are a large number of fishing machines that hook no fish, it is possible to quickly wind up all the fishing lines and hooks of these fishing machines.

It is preferred that each of the plurality of fishing machines includes a rotation sensor means for detecting a rotational speed and a rotational direction of the rotation drums, and that the hooking detection means has an unreeled length calculation means for calculating, in accordance with the result of detection of the rotation sensor means, an unreeled length of the fishing line per unit time in case that the rotation drums rotate in the unreeling direction, and judges that a fish or fishes are hooked when the unreeled length of the fishing line per unit time calculated by the unreeled length calculation means becomes equal to or more than a predetermined length.

It is also preferred that each of the plurality of fishing machines includes a current detection means for detecting a current of the drive motor, and that the hooking detection means judges that, in accordance with the result of detection of the current detection means, a fish or fishes are hooked when the current of the drive motor detected by the current detection means becomes equal to or more than a predetermined value.

According to the present invention, an automatic fishing method for controlling a plurality of fishing machines each of which has rotation drums capable of winding fishing lines and capable of rotating in a reeling direction and an unreeling direction, a drive motor for driving the rotation drums in the reeling direction and the unreeling direction, and an electromagnetic clutch for transmitting rotation of the drive motor to said rotation drums. The method includes a step of rotating, when hooking of fish at any one of the plurality of fishing machines is detected, the rotation drums of other fishing machines that hook no fish in the reeling direction so as to wind up hooks of the other fishing machines to a water surface or near the water surface.

It is preferred that the method further includes a step of detecting a rotational speed and a rotational direction of the rotation drums, a step of calculating, in accordance with the detected rotational speed and the detected rotational direction of the rotation drums, an unreeled length of the fishing line per unit time in case that the rotation drums rotate in the unreeling direction, and a step of judging that a fish or fishes are hooked when the calculated unreeled length of the fishing line per unit time becomes equal to or more than a predetermined length.

It is also preferred that the method further includes a step of detecting a current of the drive motor in case that the rotation drum rotates in the reeling direction, and a step of judging that a fish or fishes are hooked when the detected current of the drive motor becomes equal to or more than a predetermined value.

Effect of the Invention

According to the present invention, when hooking of fish at any one of the plurality of fishing machines is detected, the rotation drums of the other fishing machines that hook no fish are promptly rotated in the reeling direction so that hooks of these other fishing machines are wound up to a water surface or near the water surface. Thus, even if the hooked fish runs around in the water, it is possible to quickly prevent tangle of the fishing line or the hook of this fishing machine with fishing lines or hooks of the other fishing machines. As a result, missing of the hooked fish and damage of the fishing lines or the hooks of the other fishing machines can be automatically prevented from occurring. Also, since it is not necessary for the crew of the fishing boat to manually operate the other fishing machines that hook no fish, the safety of the crew can be ensured. Furthermore, even if there are a large number of fishing machines that hook no fish, it is possible to quickly wind up all the fishing lines and hooks of these fishing machines.

BRIEF DESCRIPTION OF DRAWINGS

FIG. 11 is a figure schematically illustrating operations of conventional fishing machines when a fish is hooked.

DESCRIPTION OF THE PREFERRED EMBODIMENT

Hereinafter, embodiments of an automatic fishing system and an automatic fishing method according to the present invention will be described with reference to the drawings.

Figure 1:
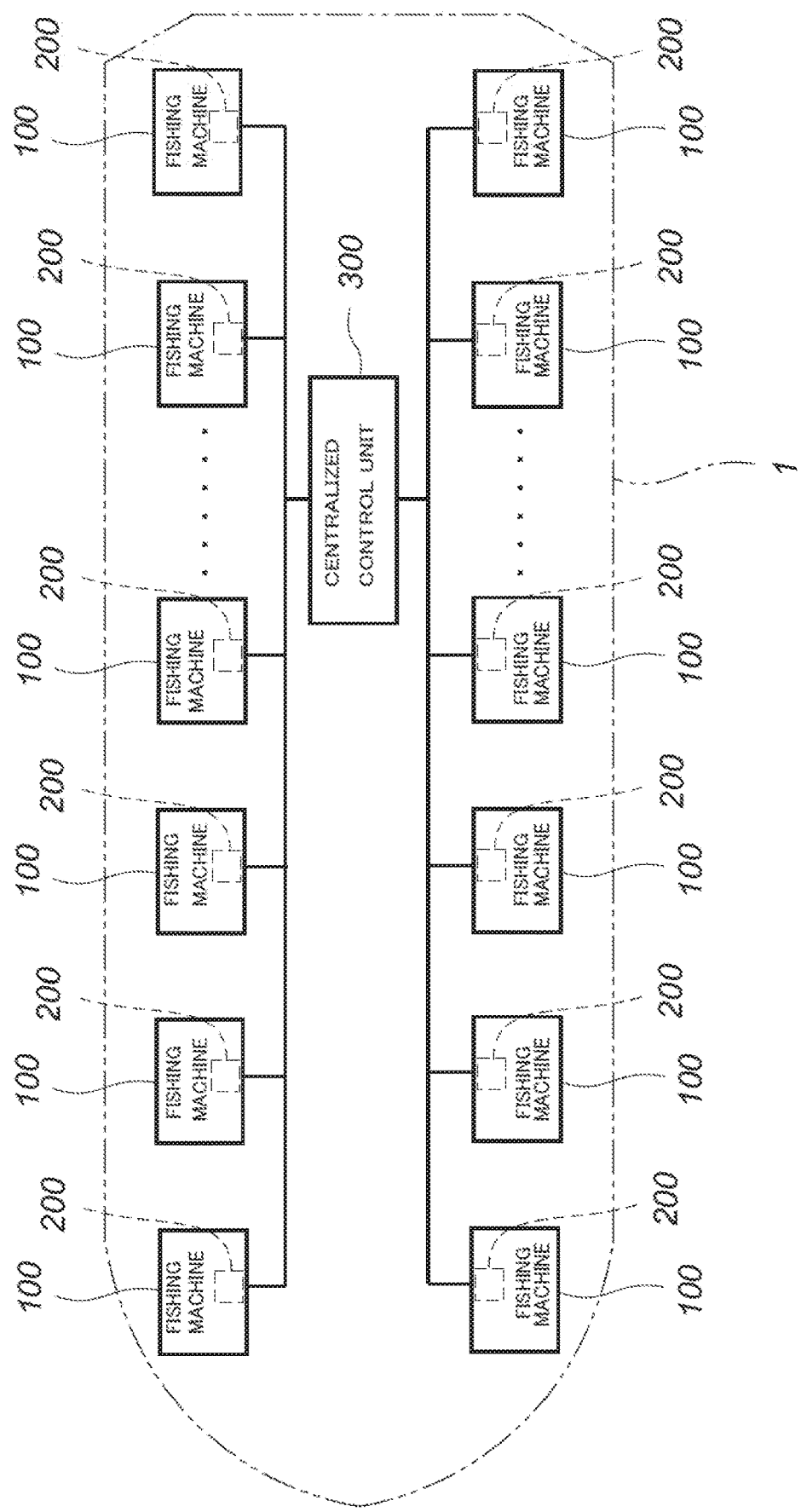
FIG. 1 is a plane view schematically illustrating constitution of an automatic fishing system of an embodiment according to the present invention.
Figure 2:
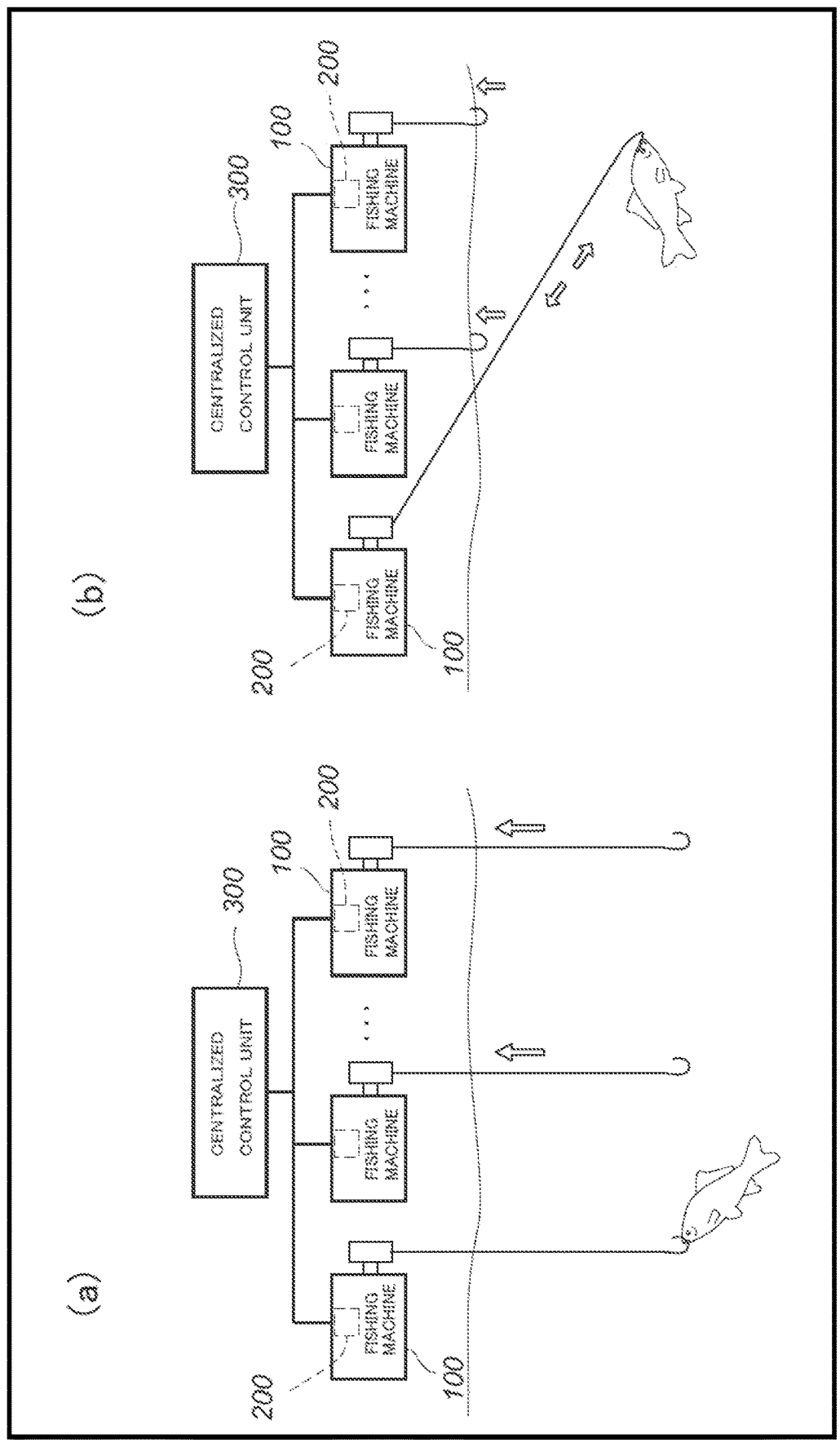
FIG. 2 is figures schematically illustrating operation states of the automatic fishing system shown in FIG. 1.
Figure 3:
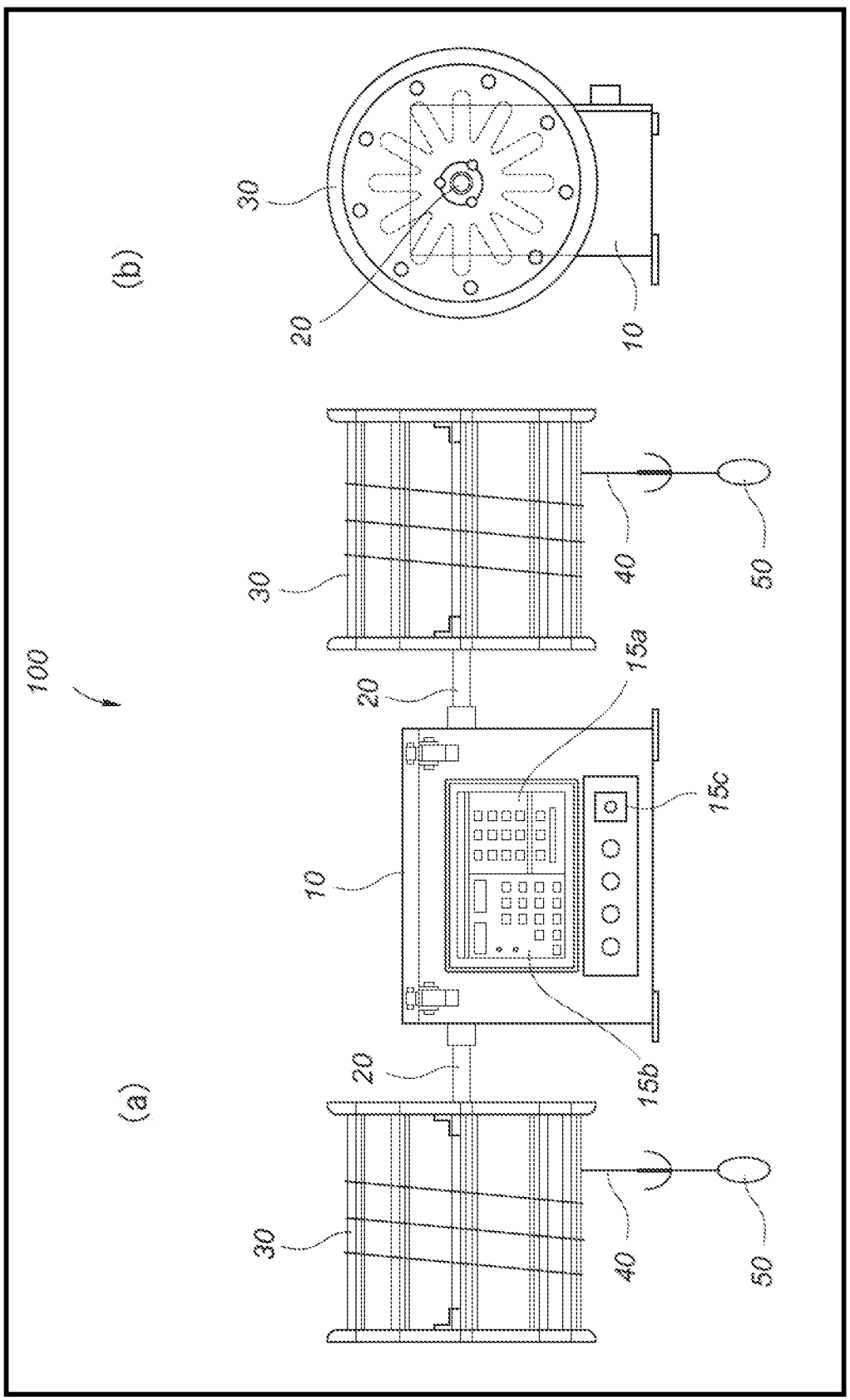
FIG. 3 is a front view and a side view schematically illustrating a fishing machine in the automatic fishing system shown in FIG. 1.
Figure 4:
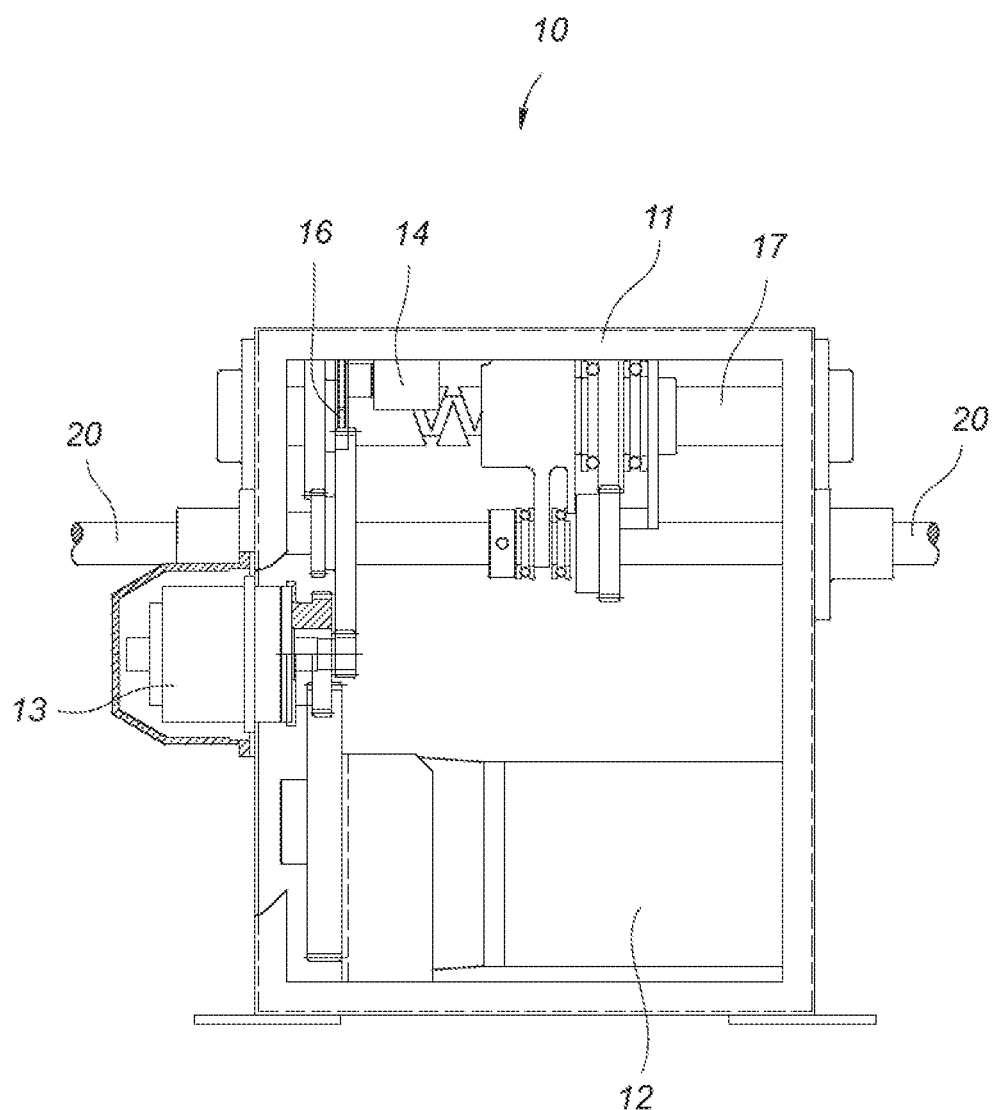
FIG. 4 is a front view schematically illustrating an internal structure of the fishing machine in the automatic fishing system shown in FIG. 1.

FIG. 1 schematically illustrates constitution of an automatic fishing system 1000 of an embodiment according to the present invention, and FIG. 2 schematically illustrates an operation state of this automatic fishing system 1000. In FIG. 2, (a) shows the state where hooking of fish on one fishing machine is detected and other fishing machine 100 starts reeling (winding-up) of the fishing line, and (b) shows the state where the other fishing machine 100 winds up the fishing line hook to the surface of the water. In the figure, only one side rotation drum 30 of each fishing machine 100 is illustrated. FIGS. 3 and 4 illustrate the fishing machine 100 in this automatic fishing system 1000, and FIG. 5 illustrates an electrical constitution of the fishing machine 100.

As shown in FIGS. 1 and 2, the automatic fishing system 1000 of this embodiment has a plurality of fishing machines 100 mounted on a fishing boat 1, a hooking detection unit 200 (corresponding to the hooking detection means according to the present invention) for always detecting hooking of fish, and a centralized control unit 300 (corresponding to the fishing machine control means according to the present invention) quickly controls operations of the plurality of fishing machines 100 when the hooking detection unit 200 detects hooking of fish.

As shown in FIGS. 3 and 4, each of the fishing machines 100 is provided with a fishing machine body 10, a drum axis 20, a pair of rotation drums 30 attached to the fishing machine body 10 through the drum axis 20, a pair of fishing lines 40, and a pair of weights 50.

Figure 5:
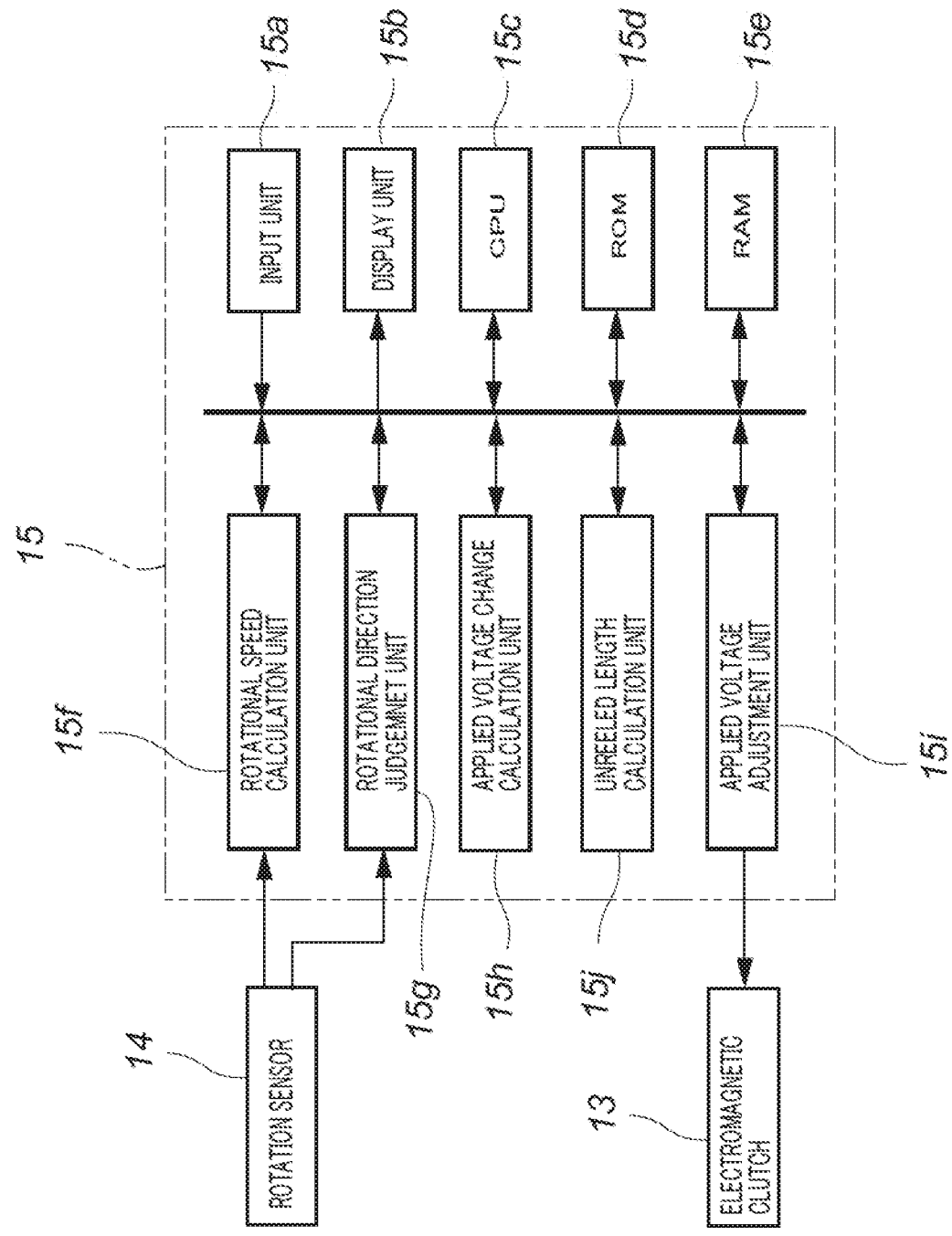
FIG. 5 is a block diagram schematically illustrating an electrical constitution of the fishing machine in the automatic fishing system shown in FIG. 1.

As shown in FIG. 4, the fishing machine body 10 has a housing 11, a drive motor 12 arranged inside the housing 11 for driving the rotation drums 30 shown in FIG. 3, an electromagnetic clutch 13 for transmitting the rotation of the drive motor 12 to the rotation drums 30, a rotation sensor 14 (corresponding to the rotation sensor means according to the present invention) for detecting a rotational speed and a rotational direction of the rotation drums 30, and a control unit 15 shown in FIG. 5 for controlling the drive motor 12 and the electromagnetic clutch 13 based on the detected result of the rotation sensor 14.

As shown in FIG. 3, a control panel of the control unit 15 is attached to the housing 11, and an input unit 15*a*, a display unit 15*b* and a power switch 15*c* are formed on this control panel.

The drive motor 12 is installed at the lower part in the housing 11 as shown in FIG. 4. The driving force of this drive motor 12 is transmitted to the drum axis 20 and a movable shaft 17 through the electromagnetic clutch 13 and a transmission gear. The movable shaft 17 is configured to rotate while moving the drum axis 20 to the right and left side. The rotation sensor 14 is coupled with the movable shaft 17 through a chain 16.

As for the electromagnetic clutch 13, a powder clutch for example is used. The powder clutch uses a fine iron powder filled in a space between a rotor attached to one shaft and a rotor attached to the other shaft. The fine iron powder can be magnetized by electromagnets from outside to mechanically link these rotors. When the powder is not magnetized, the rotors do not form chains connecting them and no transmission of the torque is carried out. But when magnetized, the powder is attracted in the space between the rotors to form chains connecting the rotors and thus the torque is transmitted. The strength of the chains can be finely controlled depending on the strength of the magnetic field applied. It should be noted that the electromagnetic clutch 13 is not limited to the powder clutch, but any type of clutch with the similar function may be used.

The rotation sensor 14 may be formed by a rotary encoder for detecting the rotational speed and the rotational direction of the rotation drums 30.

As shown in FIG. 5, the control unit 15 is provided with the input unit 15*a* consisting of a key board, a liquid crystal touch panel or else, the display unit 15*b* consisting of a liquid crystal display or a liquid crystal touch panel, a CPU 15*c*, a ROM 15*d*, a RAM 15*e*, a rotational speed calculation unit 15*f* (corresponding to the rotational speed calculation means according to the present invention) for calculating the rotational speed of the rotation drums 30 from an output signal of the rotation sensor 14, a rotational direction judgement unit 15*g* (corresponding to the rotational direction judgement means according to the present invention) for judging, from the output signal of the rotation sensor 14, the rotational direction of the rotary drums 30, that is, whether the rotation of the rotation drums 30 is in the reeling direction (normal rotation) or in the unreeling direction (reverse direction), an applied voltage change calculation unit 15*h* (corresponding to the applied voltage change calculation means according to the present invention) for calculating a change amount of voltage applied to the electromagnetic clutch 13, which is necessary for keeping the rotational speed of the rotation drums 30 at a predetermined rotational speed, based on the rotational speed calculated by the rotational speed calculation unit 15*f*, when the rotational direction of the rotation drums 30 judged by the rotational direction judgement unit 15*g* is in the unreeling direction, an applied voltage adjustment unit 15*i* (corresponding to the applied voltage adjustment means according to the present invention) for increasing or decreasing the voltage applied to the electromagnetic clutch 13 from the predetermined applied voltage, depending on the change amount calculated by the applied voltage change calculation unit 15*h*, and an unreeled length calculation unit 15*j* (corresponding to the unreeled length calculation means according to the present invention) for calculating an unreeled length of the fishing line per unit time.

The CPU 15*c* controls overall operations of the fishing machines 100, using the RAM 15*e* as a work area, in line with a control program stored in the ROM 15*d*.

The applied voltage change calculation unit 15*h* is configured to calculate a change amount of voltage applied to the electromagnetic clutch 13, which is necessary for keeping the unreeling speed of the fishing line at a predetermined value, based on the obtained rotational speed, when it is judged that the rotation drums 30 reversely rotate. More concretely, the applied voltage change calculation unit 15*h* calculates the product of the rotational speed obtained from the rotational speed calculation section 15*f* with a predetermined constant as the change amount of voltage applied to the electromagnetic clutch 13.

The applied voltage adjustment unit 15*i* increases or decreases the predetermined voltage set value (or the reeling force set value) for driving the electromagnetic clutch 13 by the change amount of the applied voltage that is calculated by the applied voltage change calculation unit 15*h*, and applies the obtained voltage to the electromagnetic clutch 13.

The unreeled length calculation unit 15*j* calculates the unreeled length of the fishing line per unit time when the rotation drums 30 rotate in the unreeling direction or winddown direction, based on the detected result of the rotation sensor 14.

The control unit 15 controls to drive the rotation drums 30 in the unreeling direction by means of the drive motor 12 when the rotational speed calculated by the rotational speed calculation unit 15*f* is less than a first predetermined rotational speed, while the rotation direction judged by the rotational direction judgement unit 15*g* is in the unreeling direction, and to stop the drive of the rotation drums 30 by means of the drive motor 12 when the rotational speed calculated by the rotational speed calculation unit 15*f* is equal to or more than the first predetermined rotational speed, while the rotational direction judged by the rotational direction judgement unit 15*g* is in the unreeling direction. Also, the control unit 15 controls to connect the electromagnetic clutch 13 when the rotational speed calculated by the rotational speed calculation unit 15*f* is less than a second predetermined rotational speed, while the rotational direction of the rotation drums 30 is in the unreeling direction, and to disconnect the electromagnetic clutch 13 when the rotational speed calculated by the rotational speed calculation unit 15*f* is equal to or more than the second predetermined rotational speed, while the rotational direction of the rotation drums 30 is in the unreeling direction. Furthermore, the control unit 15 promptly transmits the detected result to the centralized control device 300 when the hooking detection unit 200 detects hooking of fish.

Also, the control unit 15 can automatically set the transmitting torque of the electromagnetic clutch 13 to a transmitting torque for auxiliary operation mode of the electromagnetic clutch 13 (clutch-auxiliary operation mode). Setting of the transmitting torque for the clutch-auxiliary operation mode may be automatically performed by the control unit 15 as described later or may be manually performed by the operator. In case of manually performing the setting, the transmitting torque of the electromagnetic clutch 13 is gradually increased from zero while the drive motor 12 is driven to rotate the rotation drums 30 in the unreeling direction, and a torque value when the rotation drums 30 start the rotation is set to the electromagnetic clutch 13 as a transmitting torque for clutch-auxiliary operation mode.

The drum axis 20 shown in FIGS. 3 and 4 is installed to pass through the housing 11 of the fishing machine body 10. At the both end portions of the drum axis 20, the rotation drums 30 are mounted, respectively.

In this embodiment, each of the rotation drums 30 is configured by a circular-shaped rotary drum having a reeling section 31 with a circular axial cross-section for winding the fishing line 40. The rotation drum 30 is driven to rotate in appropriate directions by the fishing machine body 10 and thus the fishing line 40 is reeled and unreeled. A hook with a lure tackle such as a branched line hook or artificial hook for squid is attached to the fishing line 40. Also, the weight 50 is attached to the tip of the fishing line 40.

The hooking detection unit 200 in this embodiment is configured by the rotation sensor 14, the rotational speed calculation unit 15f, the rotational direction judgement unit 15g, and the unreeled length calculation unit 15j. The unreeled length calculation unit 15j calculates an unreeled length of the fishing line per unit time, caused by pulling of the hooked fish, depending on the processed result of the rotational speed calculation unit 15f and the rotational direction judgement unit 15g in case that the rotation drums 30 rotate in the unreeling direction. The unreeled length of the fishing line per unit time calculated by the unreeled length calculation unit 15j is compared with a predetermined set value, and when the calculated unreeled length of the fishing line per unit time is equal to or larger than the predetermined set value, it is judged that a fish or fishes are hooked. Then, a fish hooking signal is promptly transmitted to the centralized control device 300. It should be noted that the same set value (for the unreeled length of the fishing line per unit time) is used in each action of the rotation drums 30 (when being stopped, when scooping, when reeling, or when unreeling) in this embodiment. However, the set value is not limited to the same value, but different values (for example, a slightly small value when being stopped or a slightly big value when reeling) may be used depending on the actions of the rotation drums 30.

The centralized control unit 300 is configured by a computer provided with an input section, a recording section, a data processing section, a control section, a display section, a sending section, a receiving section and an output section. The control section temporally stops the operation of the fishing machines 100 that hook no fish, rotates the rotation drums 30 of these fishing machines 100 in the reeling direction so that hooks of these fishing machines are wound up to a water surface or near the water surface (to a position at which these hooks of the fishing machines that hook no fish will not entangle with the fishing line and/or the hook of other fishing machines that hook fish).

Figure 6:
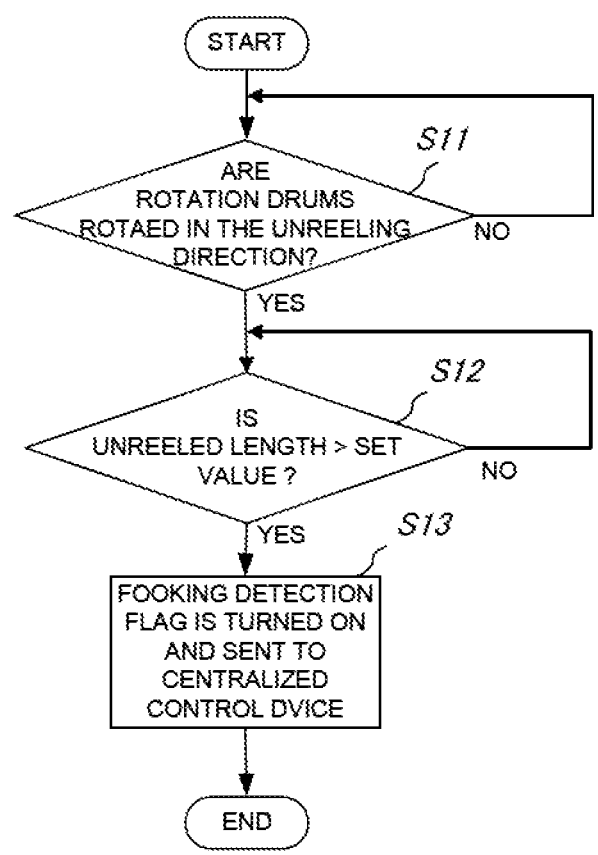
FIG. 6 is a flow chart illustrating a hooking detection operation based on an unreeled length of the fishing line in the automatic fishing system shown in FIG. 1.
Figure 7:
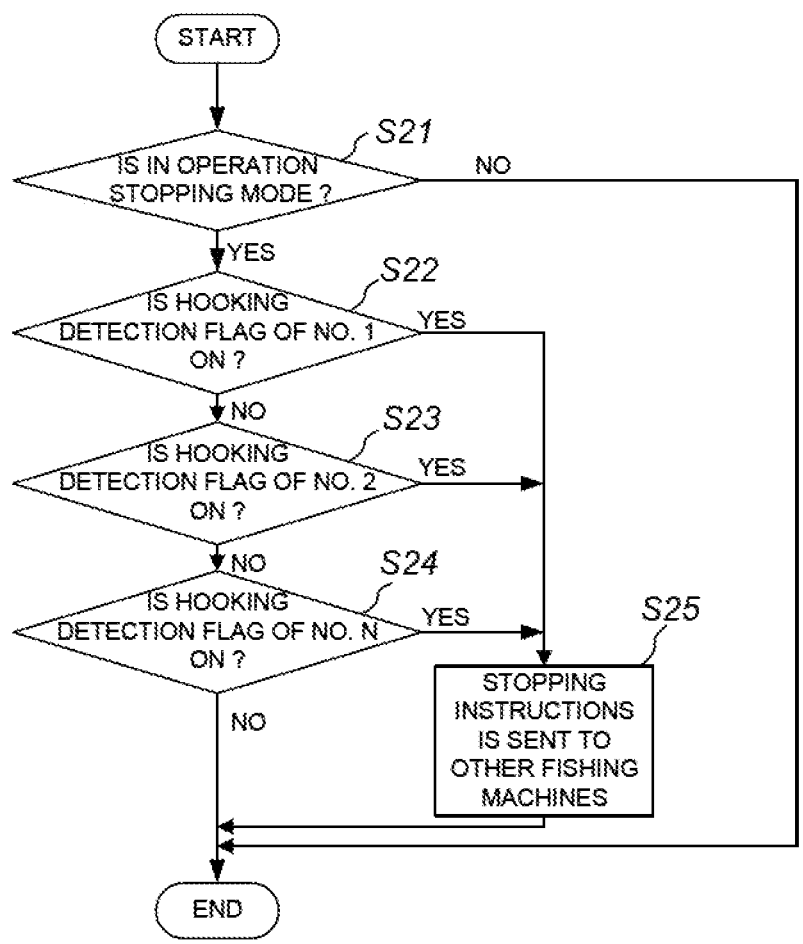
FIG. 7 is a flow chart illustrating a control operation when hooking of fish is detected in the automatic fishing system shown in FIG. 1.
Figure 8:
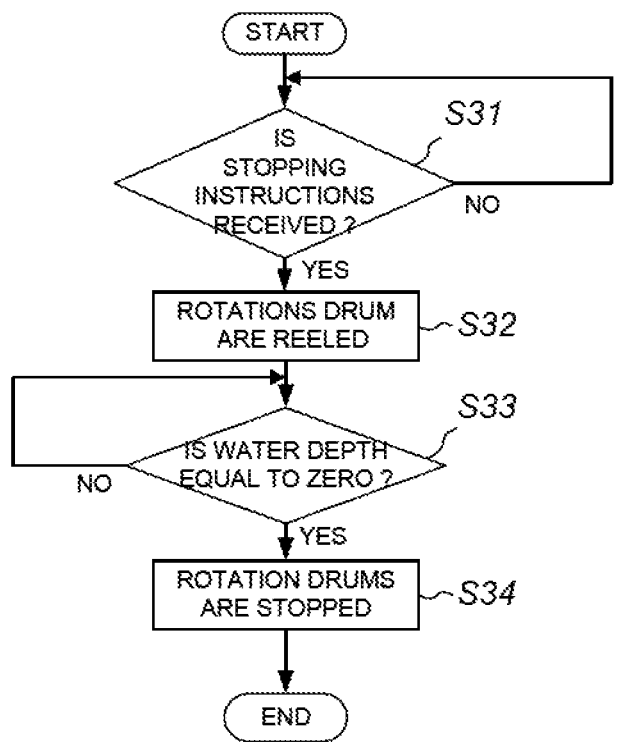
FIG. 8 is a flow chart illustrating an operation of the fishing machine when hooking of fish is detected, in the automatic fishing system shown in FIG. 1.

Hereinafter, a control method of the automatic fishing system 1000 will be described with reference to FIGS. 6, 7 and 8, wherein FIG. 6 illustrates a hooking detection operation based on an unreeled length of the fishing line 40, FIG. 7 illustrates a control operation of the centralized control device 300 when hooking of fish is detected, and FIG. 8 illustrates an operation (stopping operation) of the fishing machine 100 when hooking of fish is detected.

As shown in FIG. 6, in order to always detect hooking of fish based on an unreeled length of the fishing line 40 per unit time, at first, it is judged whether the rotation drums 30 rotate in the unreeling direction or not (Step S11). If it is judged that, at Step S11, the rotation drums 30 rotate in the unreeling direction (in case of YES), whether the unreeled length is larger than a set value or not is then judged at Step S12. If it is judged that, at Step S12, the unreeled length is larger than the set value (in case of YES), a hooking detection flag is turned on and sent to the centralized control device 300 (Step S13). Then, this hooking detection operation is finished.

Hereinafter, a control method of the centralized control device 300 when hooking of fish is detected in the automatic fishing system 1000 having the plurality of (No. 1, No. 2, . . . , No. N) fishing machines 100 will be described. At first, as shown in FIG. 7, whether it is in an operation stopping mode of other fishing machines 100 (a mode in which the operation of other fishing machines is temporally stopped and the hooks are wound up to a water surface) or not is judged when a hooking of fish is detected (Step S21). If judged as it is in the operation stopping mode, whether a hooking detection flag of a No. 1 fishing machine is ON or not is judged at Step S22. If judged, at Step S22, that the hooking detection flag of the No. 1 fishing machine is ON, the program advances to Step S25. On the other hand, if judged that the hooking detection flag of the No. 1 fishing machine is not ON, whether a hooking detection flag of a No. 2 fishing machine is ON or not is judged at Step S23. If judged, at Step S23, that the hooking detection flag of the No. 2 fishing machine is ON, the program advances to Step S25. On the other hand, if judged that the hooking detection flag of the No. 2 fishing machine is not ON, whether a hooking detection flag of a No. N fishing machine is ON or not is judged at Step S24. If judged, at Step S24, that the hooking detection flag of the No. N fishing machine is ON, the program advances to Step S25. On the other hand, if judged that the hooking detection flag of the No. N fishing machine is not ON, processes of FIG. 7 is finished. On the other hand, if judged, at Step S22, S23 or S24, that the hooking detection flag is ON, an operation stopping instructions is sent to the fishing machines 100 other than the fishing machine at which a hooking of fish is detected.

Next, the stopping operation of each fishing machine 100 when hooking of fish is detected in the automatic fishing system 1000 will be described. At first, as shown in FIG. 8, whether an operation stopping instructions is received from the centralized control device 300 or not is judged (Step S31). If judged, at Step S31, that the operation stopping instructions is received (in case of YES), the drive motor 12 is controlled to reel (wind up) the rotation drums 30 (Step S32). Then, whether a water depth of the hook at the present time is equal to zero or not is judged (Step S33). If judged, at Step S33, that the water depth of the hook at the present time is not equal to zero (in case of NO), this judgement is repeated. On the other hand, if judged, at Step S33, that the water depth of the hook at the present time is equal to zero (in case of YES), the rotation of the rotation drums 30 is stopped (Step S34). Then, the operations responding to the operation stopping instructions are completed.

As discussed above, the automatic fishing system 1000 of this embodiment is provided with the plurality of fishing machines 100, the hooking detection unit 200 for always detecting hooking of fish, and the centralized control unit 300 for to quickly controlling operations of the plurality of fishing machines 100 depending on the detected results of the hooking detection unit 200. The centralized control unit 300 controls, as soon as hooking of fish at any one of the plurality of fishing machines 100 is detected by the hooking detection unit, to rotate the rotation drums 30 of other fishing machines 100 that hook no fish in the reeling direction so that hooks of the other fishing machines are wound up to a water surface or near the water surface (to a position at which these hooks of the fishing machines that hook no fish will not entangle with the fishing line and/or the hook of other fishing machines that hook fish).

Thus, even if the hooked fish runs around in the water, it is possible to quickly prevent tangle of the fishing line 40 or the hook of this fishing machine with fishing lines 40 or hooks of the other fishing machines 100 (FIG. 2 (*b*)). As a result, missing of the hooked fish and damage of the fishing lines 40 or the hooks of the other fishing machines 100 can be automatically prevented from occurring. Also, since it is not necessary for the crew of the fishing boat to manually operate the other fishing machines 100 that hook no fish, the safety of the crew can be ensured. Furthermore, even if there are a large number of fishing machines that hook no fish, it is possible to quickly wind up all the fishing lines and hooks of these fishing machines.

The hooking detection unit 200 in this embodiment has the unreeled length calculation unit 15*j* for calculating an unreeled length of the fishing line 40 per unit time depending on the detected result of the rotation sensor 14. As soon as the unreeled length of the fishing line per unit time calculated by the unreeled length calculation unit 15*j* becomes equal to or larger than the predetermined set value, it is judged that a fish or fishes are hooked. Thus, a rapid automatic control of fishing system can be easily performed.

In the aforementioned embodiment, hooking of fish is detected when the unreeled length of the fishing line 40 per unit time calculated by the unreeled length calculation unit 15*j* becomes equal to or larger than the predetermined set value. However, the present is not limited to this detection method.

Figure 9:
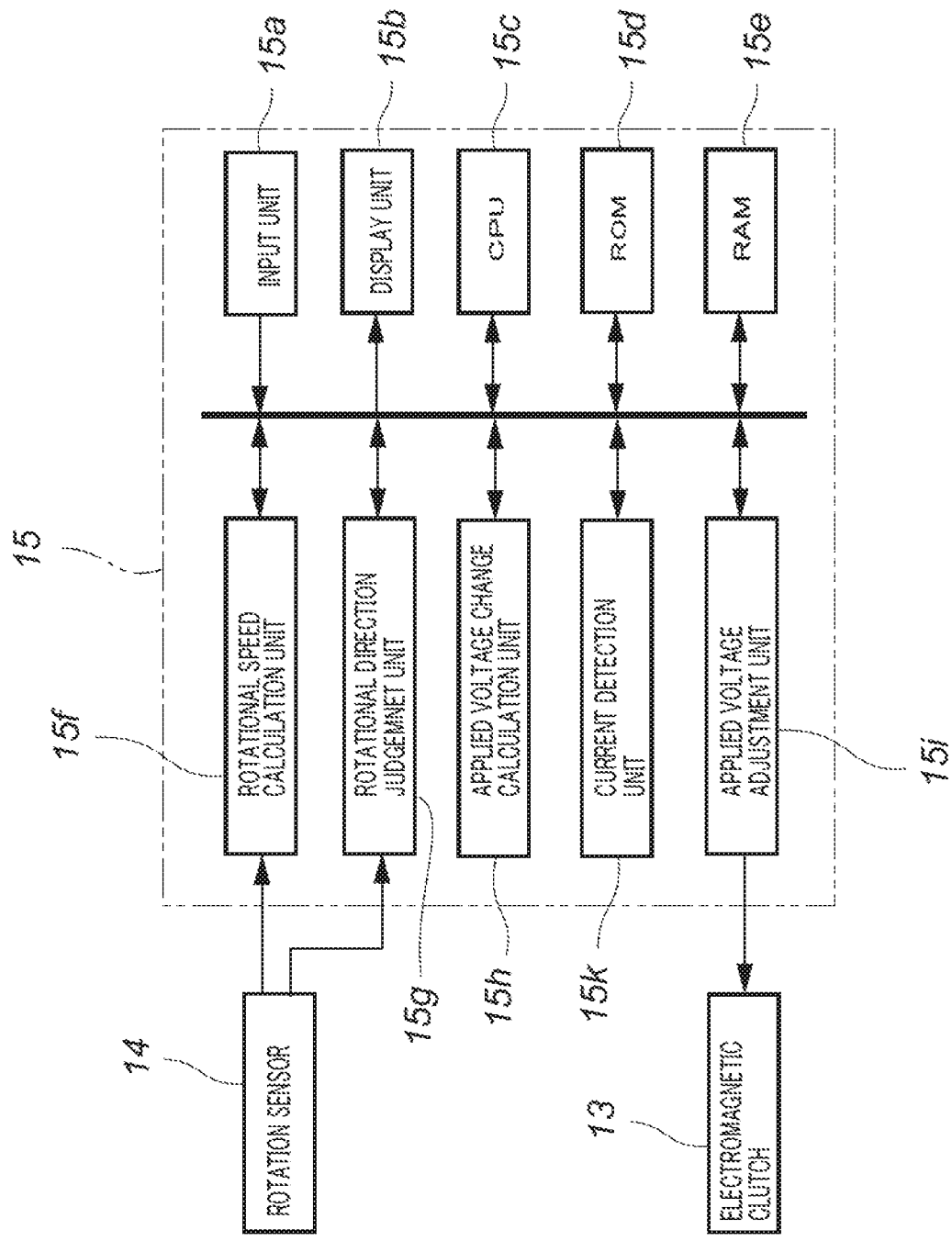
FIG. 9 is a block diagram schematically illustrating electrical constitution of a fishing machine in an automatic fishing system of another embodiment according to the present invention.
Figure 10:
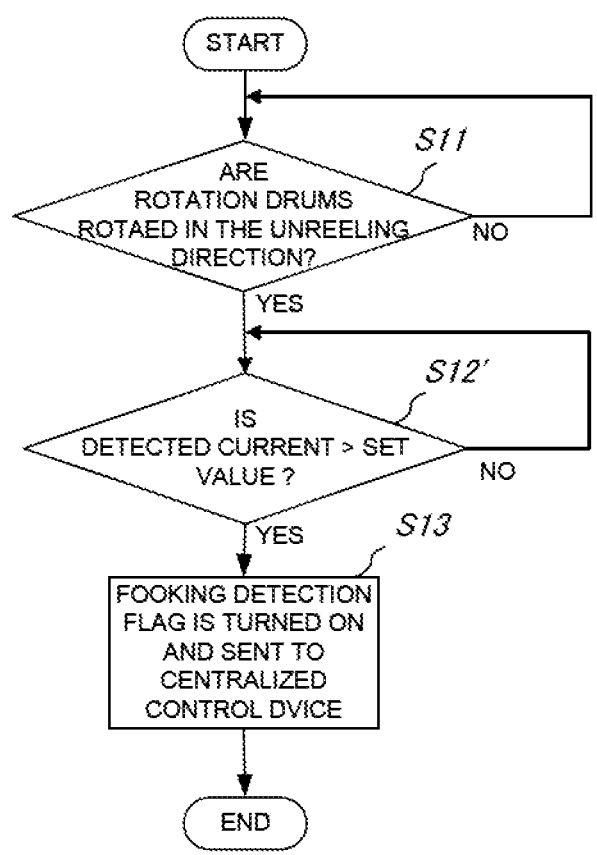
FIG. 10 is a flow chart illustrating a hooking detection operation based on a detected current of a drive motor in the automatic fishing system shown in FIG. 9.

FIG. 9 schematically illustrates electrical constitution of a fishing machine in an automatic fishing system of another embodiment according to the present invention. As will be performed in this embodiment, hooking of fish can be detected by using a current detection unit 15*k* for detecting a current of a drive motor 12 instead of the unreeled length calculation unit 15*j* in the aforementioned embodiment, and by detecting, as shown in FIG. 10, that the current flowing the drive motor 12 becomes equal to or more than a predetermined set value (Step S12'), based on the detected result of the current detection unit 15*k*, when the rotation drums 30 are reeled (wound up). In this embodiment, however, in case that the rotation drums 30 are not rotating, hooking of fish may be detected at the state where the unreeled length of the fishing line 40 per unit time becomes equal to or larger than the predetermined set value.

Although the fishing machine 100 in the aforementioned embodiments is used for catching a fish or fishes, the present invention is not limited to this. For example, the present invention can be applied to a fishing machine for catching a squid or squids.

Many widely different embodiments of the present invention may be constructed without departing from the spirit and scope of the present invention. It should be understood that the present invention is not limited to the specific embodiments described in the specification, except as defined in the appended claims.

INDUSTRIAL APPLICABILITY

The present invention is applicable to any fishing boat with a plurality of fishing machines, such as a professional fishing boat or ship, a sport fishing boat or ship, and a personal fishing boat or ship so as to automatically prevent tangle of the fishing lines or the hooks with each other.

DENOTATION OF REFERENCE NUMERALS

1: fishing boat
10: fishing machine body
11: housing
12: drive motor
13: electromagnetic clutch
14: rotation sensor
15: control unit
15*a*: input unit
15*b*: display unit
15*c*: CPU
15*d*: ROM
15*e*: RAM
15*f*: rotational speed calculation unit
15*g*: rotational direction judgement unit
15*h*: applied voltage change calculation unit
15*i*: applied voltage adjustment unit
15*j*: unreeled length calculation unit
15*k*: current detection unit
20: drum axis
30: rotation drum
40: fishing line
50: weight
100: fishing machine
200: hooking detection unit
300: centralized control device
1000: automatic fishing system

The invention claimed is:

1. An automatic fishing system comprising:
a plurality of fishing machines each of which has rotation drums capable of winding fishing lines and capable of rotating in a reeling direction and an unreeling direction, a drive motor for driving said rotation drums in the reeling direction and the unreeling direction, and an electromagnetic clutch for transmitting rotation of said drive motor to said rotation drums;
a central control unit that is configured to communicate with each of the plurality of fishing machines;
a hooking detection means for detecting hooking of fish at any one of the plurality of fishing machines and for transmitting a fish hooking signal to the central control unit, when the central control unit receives the fish hooking signal, it sends a second signal to the other fishing machines that did not hook the fish; and
a fishing machine control means for controlling operations of the plurality of fishing machines in accordance with the second signal transmitted from said central control unit,
wherein said fishing machine control means is configured to control the drive motors of the plurality of fishing machines, when the second signal is received from the central control unit, to rotate the rotation drums of other fishing machines that hook no fish in the reeling direction, and
reeling direction so as to control hooks of said other fishing machines that hook no fish in the reeling direction by winding up the fishing lines with the hooks of said other fishing machines to a water surface or near the water surface when the other fishing machines receive the second signal.

2. The automatic fishing system as claimed in claim 1, wherein each of the plurality of fishing machines comprises a rotation sensor means for detecting a rotational speed and a rotational direction of said rotation drums, and wherein said hooking detection means has an unreeled length calculation means for calculating, in accordance with the result of detection of said rotation sensor means, an unreeled length of the fishing line per unit time in case that said rotation drums rotate in the unreeling direction, and judges that a fish or fishes are hooked when the unreeled length of the fishing line per unit time calculated by said unreeled length calculation means becomes equal to or more than a predetermined length per unit time.

3. The automatic fishing system as claimed in claim 1, wherein each of the plurality of fishing machines comprises a current detection means for detecting a current of said drive motor, and wherein said hooking detection means judges that, in accordance with the result of detection of said current detection means, a fish or fishes are hooked when the current of said drive motor detected by said current detection means becomes equal to or more than a predetermined value.

4. An automatic fishing method for controlling a plurality of fishing machines each of which has rotation drums capable of winding fishing lines and capable of rotating in a reeling direction and an unreeling direction, a drive motor for driving said rotation drums in the reeling direction and the unreeling direction, and an electromagnetic clutch for transmitting rotation of said drive motor to said rotation drums, said method comprising:
 a step of communicating with each of the plurality of fishing machines;
 a step of detecting hooking of fish at any one of the plurality of fishing machines and for transmitting a fish hooking signal to a central control unit, when the fish hooking signal is received, it sends a second signal to the other fishing machines that did not hook the fish;
 a step of controlling operations of the plurality of fishing machines in accordance with the second signal transmitted from said central control unit;
 a step of controlling the drive motors of the plurality of fishing machines, when the second signal is received from the central control unit, to rotate the rotation drums of other fishing machines that hook no fish in the reeling direction; and
 fishing machines that hook no fish in the reeling direction so as to control hooks of said other fishing machines that hook no fish in the reeling direction are to be wound up to a water surface or near the water surface when the other fishing machines receive the second signal.

5. The automatic fishing method as claimed in claim 4, wherein said method further comprises a step of detecting a rotational speed and a rotational direction of said rotation drums, a step of calculating, in accordance with the detected rotational speed and the detected rotational direction of said rotation drums, an unreeled length of the fishing line per unit time in case that said rotation drums rotate in the unreeling direction, and a step of judging that a fish or fishes are hooked when the calculated unreeled length of the fishing line per unit time becomes equal to or more than a predetermined length per unit time.

6. The automatic fishing method as claimed in claim 4, wherein said method further comprises a step of detecting a current of said drive motor in case that said rotations drum rotate in the reeling direction, and a step of judging that a fish or fishes are hooked when the detected current of said drive motor becomes equal to or more than a predetermined value.

\* \* \* \* \*